United States Patent
Weiss

(10) Patent No.: US 9,538,766 B2
(45) Date of Patent: Jan. 10, 2017

(54) AUTOMATIC BAKING MACHINE

(75) Inventor: Reinald Weiss, Schopfloch (DE)

(73) Assignee: R. Weiss Verpackungstechnik GmbH and Co. KG, Crailsheim (DE)

( * ) Notice: Subject to any disclaimer, the term of this patent is extended or adjusted under 35 U.S.C. 154(b) by 542 days.

(21) Appl. No.: 13/322,681

(22) PCT Filed: May 28, 2010

(86) PCT No.: PCT/EP2010/057394
§ 371 (c)(1),
(2), (4) Date: Nov. 28, 2011

(87) PCT Pub. No.: WO2010/136555
PCT Pub. Date: Dec. 2, 2010

(65) Prior Publication Data
US 2012/0067227 A1  Mar. 22, 2012

(30) Foreign Application Priority Data
May 29, 2009 (DE) .................. 10 2009 026 619

(51) Int. Cl.
*A21B 1/42* (2006.01)
*A21B 7/00* (2006.01)
(Continued)

(52) U.S. Cl.
CPC . *A21B 7/00* (2013.01); *A21B 1/46* (2013.01); *A21B 1/48* (2013.01)

(58) Field of Classification Search
CPC ............... A21B 1/46; A21B 1/48; A21B 3/07; A21B 7/00; G07F 11/42; G07F 9/105; G07F 11/10; G07F 11/165; A21C 9/083
See application file for complete search history.

(56) References Cited

U.S. PATENT DOCUMENTS 2,501,712 A *  3/1950  Chodziesner .................. 99/357
4,100,848 A    7/1978  Grissinger
(Continued)

FOREIGN PATENT DOCUMENTS

DE     641 037      12/1936
DE    31 45 792 A1  9/1982
(Continued)

OTHER PUBLICATIONS

German Patent Office Search Report, Mar. 5, 2010.
(Continued)

*Primary Examiner* — David Angwin
*Assistant Examiner* — Amit K Singh
(74) *Attorney, Agent, or Firm* — Dority & Manning, P.A.

(57) ABSTRACT

An automatic baking machine includes a loading unit having a plurality of carriers on a first conveyor configured for receipt of individual goods to be baked. A downstream oven unit has a transportation device to transport the goods received from the loading unit through the oven unit. A delivery unit is arranged downstream from the oven unit and includes a second conveyor with a plurality of carriers for receipt of baked goods from the transportation device. A vertically stationary linear conveyor is arranged between the first conveyor and the transportation device, wherein the goods to be baked are transferred from the first conveyor to the linear conveyor, conveyed by the linear conveyor in a vertically fixed plane, and transferred from the linear conveyor to the transportation device.

12 Claims, 4 Drawing Sheets

(51) Int. Cl.
  *A21B 1/46* (2006.01)
  *A21B 1/48* (2006.01)

(56) References Cited

U.S. PATENT DOCUMENTS

| | | | |
|---|---|---|---|
| 4,125,205 A * | 11/1978 | Ambroise | 221/129 |
| 4,349,714 A | 9/1982 | Tamano | |
| 7,581,636 B2 * | 9/2009 | Martinez | B65G 47/92 198/418.6 |
| 2002/0029698 A1 * | 3/2002 | van de Vorst et al. | 99/477 |
| 2002/0071883 A1 * | 6/2002 | Pasch | 425/238 |
| 2003/0056663 A1 * | 3/2003 | Ciprietti | A47F 3/08 99/537 |
| 2006/0137538 A1 | 6/2006 | Anderl | |
| 2008/0163762 A1 | 7/2008 | Weiss | |

FOREIGN PATENT DOCUMENTS

| | | |
|---|---|---|
| DE | 101 16 423 A1 | 10/2002 |
| DE | 10 2005 001 596 A1 | 7/2006 |
| DE | 10 2005 002 475 A1 | 7/2006 |
| DE | 10 2005 057 866 A1 | 6/2007 |
| EP | 0 708 421 A1 | 4/1996 |
| EP | 1 680 961 A2 | 7/2006 |
| EP | 1 688 042 A2 | 8/2006 |
| FR | 2 508 274 | 12/1982 |
| FR | 2 821 524 | 9/2002 |

OTHER PUBLICATIONS

PCT Search Report, Aug. 5, 2010.
International Preliminary Report on Patentability, Mar. 29, 2011.
EP Office Action, Apr. 7, 2014.

* cited by examiner

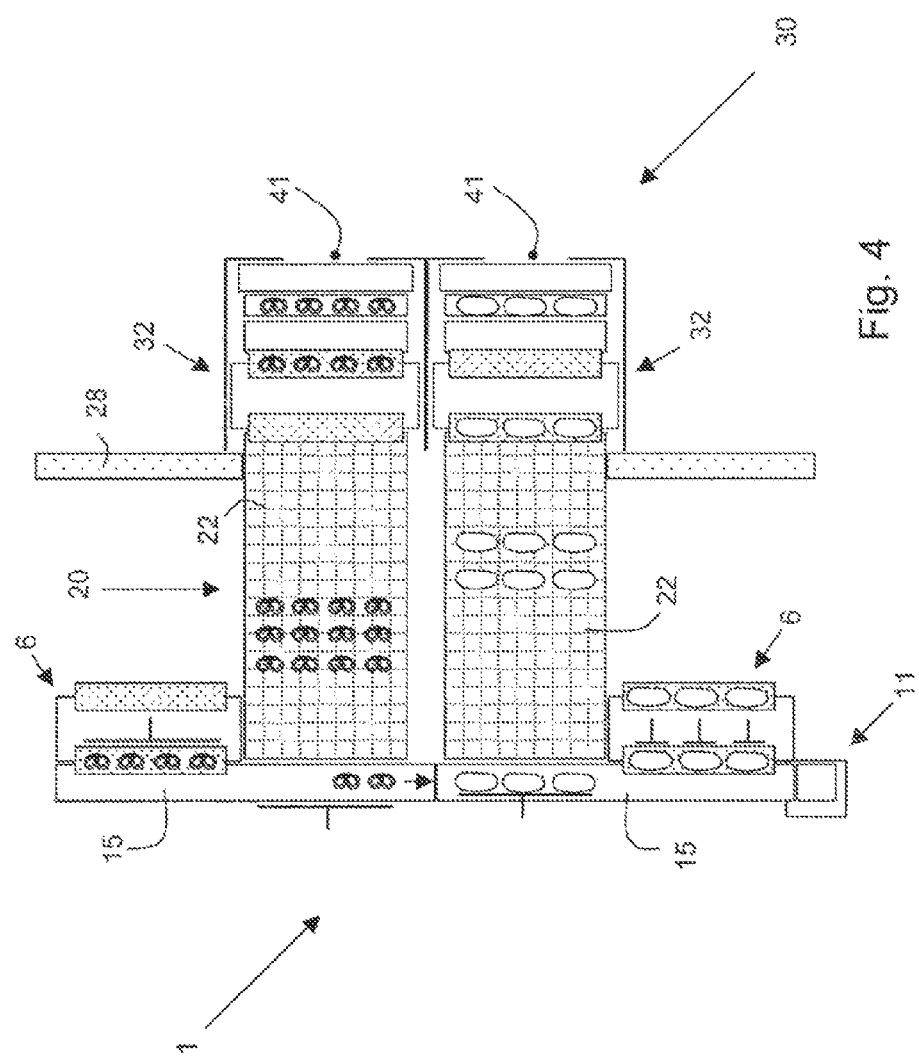

AUTOMATIC BAKING MACHINE

FIELD OF THE INVENTION

This invention refers to an automatic baking machine having a conveyor equipped with peripheral carriers for delivering baked goods to an oven, and a delivery unit with a second conveyor for receiving the baked goods from the oven.

BACKGROUND

Such an automatic baking machine for installation above all in supermarkets is known from EP 1 688 042 A2, for example. On the loading side of this automatic baking machine, baked goods are placed on carriers of a paternoster elevator (also known merely as "paternoster") and held there. Reacting on a demand from the control unit, a correspondingly measured number of baking goods is linearly transported from the filled carriers in a continuous baking oven and stored in carriers of a paternoster elevator on the delivery side after baking. From there, one or more baking goods are deposited in a collection container and guided to a dispensing compartment when requested by customers. In an alternative embodiment, the requested baked goods are directly transported from a carrier to a dispensing compartment.

A task of this invention is to improve the known automatic baking machine even more, especially with regard to its ease of maintenance and operation.

SUMMARY

Additional objects and advantages of the invention will be set forth in part in the following description, or may be obvious from the description, or may be learned through practice of the invention.

An embodiment of an automatic baking machine has a loading unit for especially the manual loading of baked goods, whereby the loading unit has at least one first conveyor device equipped with numerous preferably peripheral carriers for receiving several adjacent individual baked goods. An oven unit is mounted downstream from the loading unit and has a transportation device for transporting the baked goods. A delivery unit is mounted downstream from the baking device and has at least a second conveyor device with numerous preferably peripheral carriers for receiving several adjacent baked goods, wherefrom the baked goods are guided to at least one dispensing compartment. At least one stationary linear conveyor for the baked goods is arranged between the first conveyor device and the transportation device of the oven unit.

One of the advantages of the invention is that the accessibility of the individual elements of the automatic baking machine is improved with the help of at least one stationary linear conveyor. Both the first conveyor device on the loading side and the oven unit are now easier to reach for the waiting and service staff, and the cleaning of the individual machine parts has been made easier. Furthermore, the invention facilitates a safe transportation of the baked goods from the preferably peripheral carriers of the first conveyor device on the loading side to the oven unit. Moreover, when the stationary linear conveyor and the transportation device of the oven unit run along a common horizontal plane, the error quota at the local baked goods delivery is very low. The preceding delivery of baked goods by the conveyor device carriers to a subsequent transportation device, however, is more error-prone in principle. It is therefore advantageous for the oven unit's error proneness to be kept at arm's length so an intervention in the oven area is less likely. In addition, when the carriers erroneously deliver on the linear conveyor device, it is easily possible to automatically clean the latter, as explained below.

It is especially advantageous for the baking to have at least one stationary linear conveyor oriented parallel to the longitudinal extension of the carriers of the first conveyor device. A simple pushing, tilting or lifting movement places the baked goods on the stationary linear conveyor, which transports the baked goods sideways to the oven. The parallel orientation facilitates access to the back side of the first conveyor device.

Preferably, the longitudinal extension or running direction of the linear conveyor device is perpendicular to the direction in which the baked goods are being transported through the oven unit. In this case, the stationary linear conveyor transports the baked goods sideways to the oven before they are then turned around by 90°. Together with the previously described parallel orientation of the linear conveyor device to the carriers, the transportation path of the baked goods looks like this: The carriers release the baked goods on the linear conveyor device perpendicular to the longitudinal extension of the carrier, the baked goods are transported away sideways on the linear conveyor device and released perpendicularly to the longitudinal extension of the linear conveyor device to the transport device of the oven unit.

In a further development of the invention, the loading unit has two conveyor devices with preferably peripheral carriers, each one connected to the oven unit via a linear conveyor device. In such a modular arrangement, each loading unit can have its own continuous baking oven. In this arrangement, the two continuous baking ovens of the oven unit can be advantageously arranged right beside each other. The oven or ovens are arranged in such a way are supplied with baked goods on the loading side by the two first conveyor devices separated from one another via their respective stationary conveyor devices. In this case, the baked goods are transported towards each other before being transported in parallel through the oven or ovens.

According to an advantageous embodiment, the at least one stationary linear conveyor is arranged on the loading side of the first conveyor device. This arrangement can also be seen as an original aspect of the invention. In this case, the linear conveyor device is essentially located above the staff that places the baked goods on the carriers. This saves construction space because in an arrangement on the other side of the conveyor device, the automatic baking machine would be wider or deeper by the width of the linear conveyor device.

Advantageously, the direction of rotation of at least one linear conveyor device is reversible to increase flexibility when the baked goods are transported to/from the carriers or the oven unit.

For a smooth running of the conveyor device even under temporary faulty transportation of baked goods, experience has shown that it is advantageous for a collection device to be located on the front side, at the end of the at least one stationary linear conveyor, so baked goods that have not reached at least one of the continuous baking ovens are transported. This embodiment can also be seen as an original aspect of the invention. Since owing to the relatively complex transportation path, such faulty transportation processes cannot be fully ruled out, and baked goods remaining on the linear conveyor device can be quickly transported to the collection device without the intervention of the waiting staff. The linear conveyor device can be operated in such a way that after every completed or putative delivery to the transportation device of the oven unit, all baked goods remaining on it (if any) are inevitably transported to the collection device.

According to an advantageous embodiment, the collection device can include a chute into which the baked goods are dropped by the linear conveyor device.

In the case of two linear conveyor devices—each one allocated to a conveyor device with preferably peripheral carriers—they are advantageously arranged so that baked goods can be delivered from one to the other. In this case, both linear conveyor devices are suitably oriented in true alignment to one another. The possibility of delivering baked goods from one linear conveyor device to the other one makes only one collection device necessary.

The transfer of the baked goods from the carriers to at least one stationary linear conveyor and/or from the at least one linear conveyor device to the transportation device of the oven unit takes place with sliders, preferably linear sliders operated by electric motors. One slider can be provided for each baked good. An option is to have one slider in charge of several baked goods. Other transfer devices are readily possible.

It is especially preferable if the baked goods deposited on a carrier of the first conveyor device have the same relative position to one another until delivery by a carrier of the second conveyor device. As a result of this, an easily controllable and neat flow of baked goods is facilitated.

Advantageously—and to be evaluated as an own aspect of the invention—the oven unit has been designed so it can be largely reached by walking on and below it between the loading and delivery unit. This embodiment facilitates both easy cleaning and easy accessibility for the servicing staff. In addition, the space underneath the baking oven can be used as storage area.

BRIEF DESCRIPTION OF THE DRAWINGS

Additional advantages and advantageous further developments of the invention result from the various additional embodiments and the figures that help to explain the embodiments in more detail. They show schematically:

FIG. 4 a top view of an automatic baking machine with two conveyor devices on the loading side and two on the delivery side as well as two continuous baking ovens.

DESCRIPTION

Figure 1:
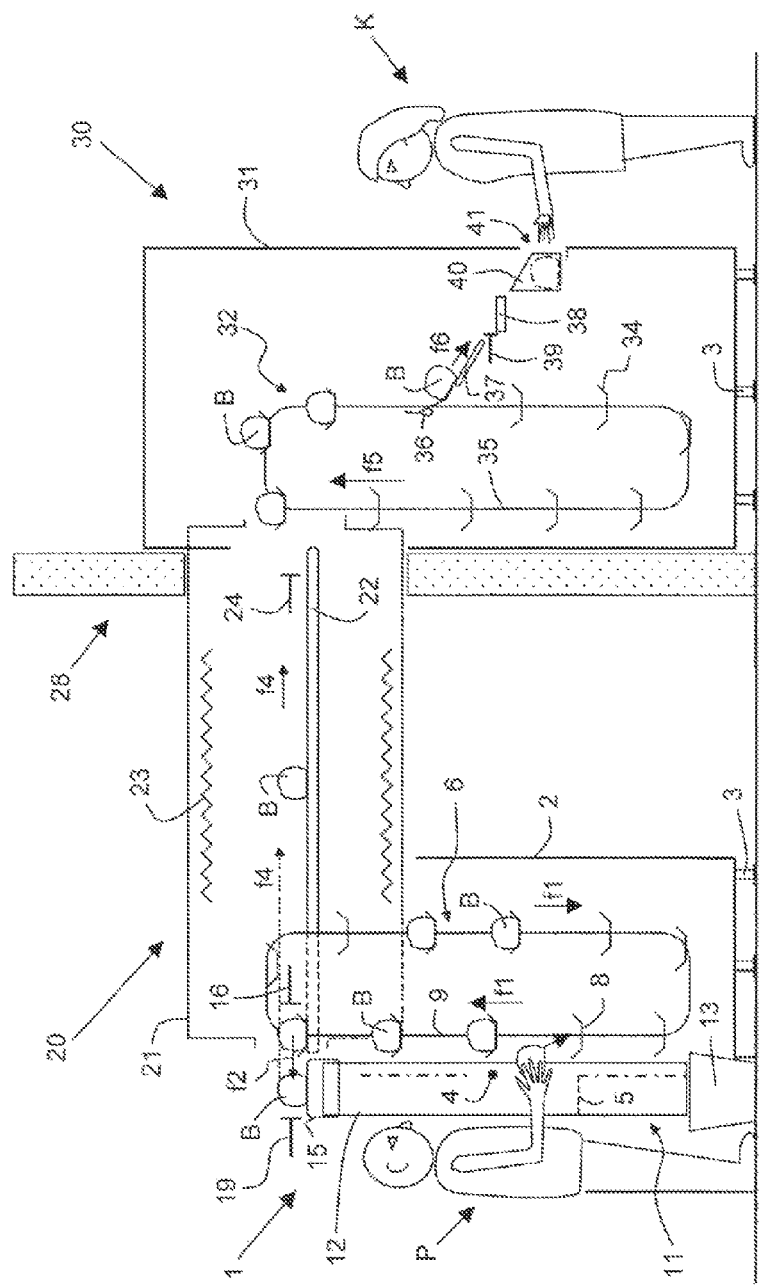
FIG. 1 a cross section of the automatic baking machine according to the invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Figure 2:
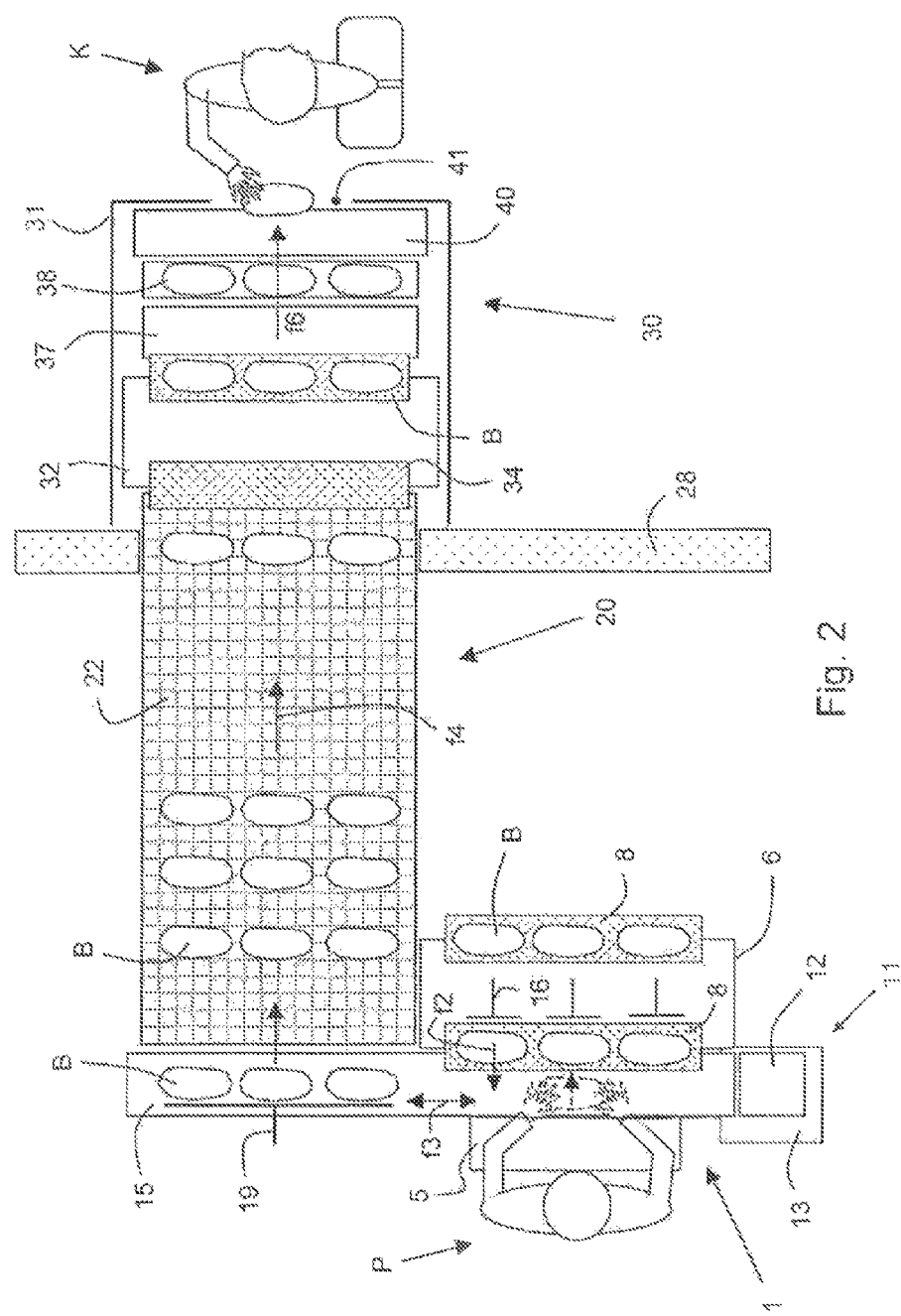
FIG. 2 a top view of the automatic baking machine according to FIG. 1.
Figure 3:
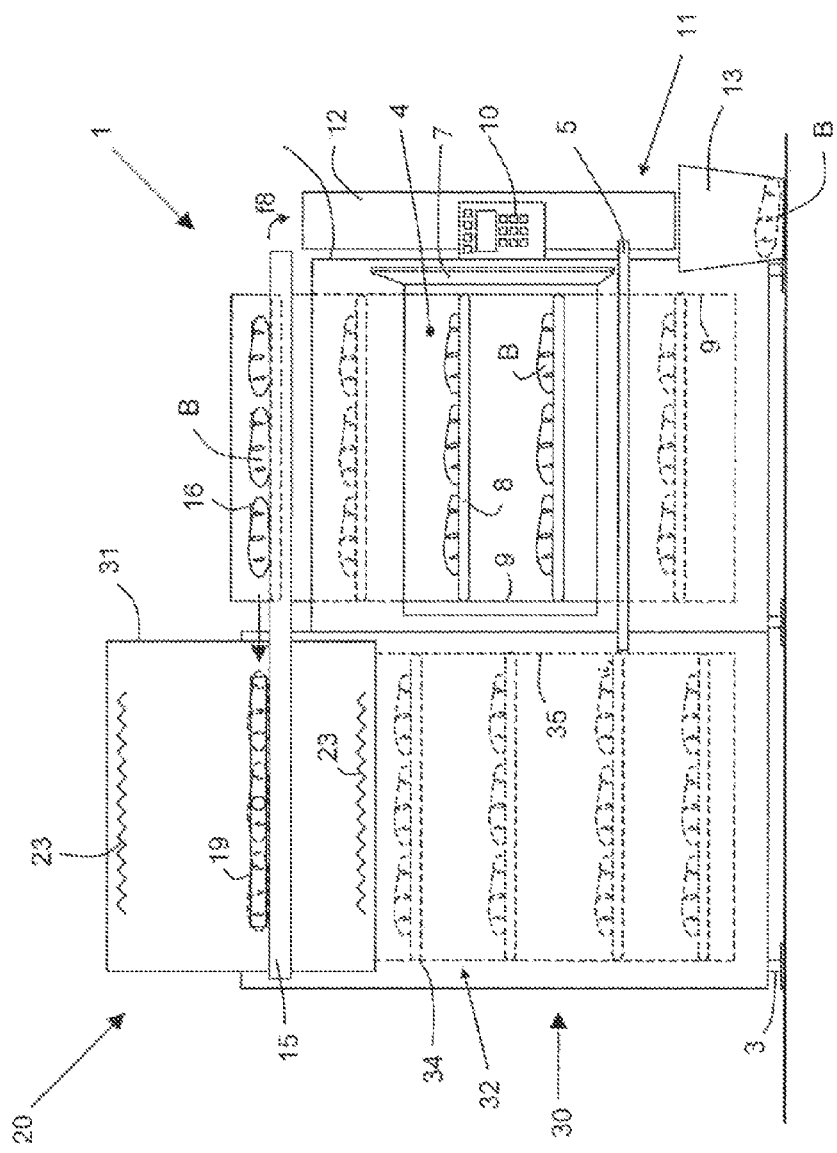
FIG. 3 the automatic baking machine according to FIGS. 1 & 2 from the user's side.

FIGS. 1-3 show schematic views of an embodiment of an automatic baking machine according to the invention, in which some parts are not shown in all figures for better clarity. The main components of the automatic baking machine are a loading unit 1 for loading baked goods B (rolls, loaves of bread, baguettes, pretzels, etc.) that need to be baked or fully baked, an oven unit 20 and a delivery unit 30 for delivering the baking goods ready to be eaten at the request of the customers. In this case, loaves of bread have been chosen as baked goods B.

The loading unit 1 has a housing 2 that stands on feet 3 in which a first conveyor device 6 in the form of a paternoster elevator 6 has been arranged on the loading side. To this end, numerous oblong carriers 8 are attached to their respective front sides with motor-driven conveying chains 9. The waiting staff P preferably puts the baked goods B manually side by side on the carriers 8. For this purpose, an opening 4 has been provided in the housing 2 that can be closed with a door 7 (see FIG. 3). In the embodiment shown, a loading table 5 has been provided before the opening so a container (such as a cardboard box, for example) with baked goods can be placed on it.

Using an input panel equipped with a display 10, the staff can request a free carrier 8 (i.e. one not yet loaded with baked goods B). In addition, staff instructions can be issued on the display—for example, which type of baked good should be baked at the moment owing to consumer demand.

The first conveyor device 6 runs peripherally in arrow direction f1 (FIG. 1), but its direction can also be reversed. Especially when a free carrier 8 is requested for loading with baked goods B, this feature is welcome for shortening the running time of the corresponding carrier 8 if need be.

The baked goods B that are not yet baked or pre-baked are stored in the conveyor device 6 until a control unit (not shown) well known to those skilled in the art moves them. For this purpose, on the side facing the waiting staff P, a stationary linear conveyor 15 executed as a conveyor device belt, for example, has been provided for running sideways in the direction of the longitudinal extension of the carriers 8. As can be especially seen in FIGS. 1 & 2, baked goods B are pushed from a carrier 8 moved correspondingly in position by sliders 16 on the linear conveyor device 15. Other transfer mechanisms—in other places of the automatic baking machine as well, see farther below—are certainly possible, for example by having the carriers 8 tilt the baked goods B on the linear conveyor device 15.

The running direction of the stationary linear conveyor 15 is reversible, see double arrow f3. When it runs forward, the linear conveyor device 15 transports the baked goods B to the inlet opening of the housing 21 of the oven unit 20. Through the oven unit 20 runs a transportation device 22 that can be executed as a peripheral chain link or network conveyor device. For transferring the baked goods B from the linear conveyor device 15 to the transportation device 22, a wide, motorized slider 19 has been provided here. Instead of a single slider 19, it is possible to use several sliders for one or a portion of the baked goods B. Conversely, this also applies to the sliders 16.

Heating elements 23 that can be executed as conventional heating spirals have been arranged in the oven unit 20. The throughput speed and/or baking temperature can be preset or also electronically controlled. An adjustment to the respective type of baked good presents itself.

The oven unit 20 is accessible from below, because the connection in series of the stationary linear conveyor 15 diverts the baked goods twice by 90°. Thus, very easy accessibility to the oven unit 20 is created for the waiting and service staff.

The delivery unit 30, in turn surrounded by a housing 31, is connected to the oven unit 20. The delivery unit 30 is provided for display in a supermarket's sales room or something similar, in which case—to minimize the standing area of the automatic baking machine in the sales room—the loading unit 1 and the oven unit 20 are set up outside of the sales room and separated from it by a wall 28.

After baking or full baking, the slider 24 (shown only in FIG. 1) pushes the baked goods from the transportation device 22 on peripheral carriers 34 of a second peripheral conveyor device 32 shaped like a paternoster elevator, which is driven by front-sided conveyor device chains 35 located in the delivery unit 30 that stores the baked goods B that have just been baked until they are delivered to the customer K. A corresponding service display for the customer K is not shown here, but readily known to the expert.

A temporary storage compartment 38 has been provided between carrier 34 and a dispensing compartment 41 accessible to the customer K on which in the embodiment shown here, the baked goods B are tilted by a carrier 34. To accomplish this, the corresponding carrier 34 runs from above against electronically-controlled pins 36 movable from a resting to a working position and this swivels the carrier 34. The baked goods B then slide on a first slide 37 on the temporary storage compartment 38 mentioned above, from which one or several baked goods B are pushed—if requested by a customer K—with the help of the slider 39 into a funnel slide 40 on which the requested baked goods B slide to the dispensing compartment 41.

Since the baked goods lie only loose on all transportation elements, the transfer to the next one cannot always be ensured. For this purpose, a collection device 11 located on the frontal side facing away from the oven unit 20 has been especially provided for the linear conveyor device 15. In the present case, the collection device 11 consists of one chute 12 running perpendicularly and a collecting container 13 placed underneath that can be manually emptied.

When the linear conveyor device 15 cannot successfully push the baked goods B to the transportation device 22, the conveying direction of the linear conveyor device 15 is reversed and it runs as long as all baked goods B that are still on it are dropped off into the chute 12. The reverse movement of the linear conveyor device 15 can be initiated, for example, every time the slider 19 is activated, so that the linear conveyor device 15 runs nonetheless backwards too when the baked goods B are successfully delivered to the transportation device 22. According to an alternative, the reverse movement can be triggered when a sensor (not shown) registers the presence of at least one baked good B on the linear conveyor device after the slider 19 has been activated. In any case, the reverse path of the linear conveyor device 15 is always longer than the transportation path from the carriers 8 to the transfer position before the oven unit 20.

FIG. 4 shows a schematic top view of an automatic baking machine in which the loading unit 1 has two conveyor devices 6, the oven unit 20 has two continuous baking ovens, and the delivery unit 30 likewise has two conveyor devices 32 with two dispensing compartments 41 as well, in which case each stationary linear conveyor 15 supplies the two continuous baking ovens. Various baked goods B (on the one hand, loaves of bread, on the other hand, pretzels) are stored in the carriers 8 of the two conveyor devices 6. Three loaves can be placed on one carrier 8; in the case of the pretzels, four.

Needless to say, it is also possible for various baked goods B to be placed on different carriers 8 of an individual conveyor device 6 and held in various correspondingly provided temporary storage compartments in the delivery unit 30 until they are requested. Such variability makes it possible to adjust the different spatial circumstances to the number of visiting customers and taste preferences in the respective regions and supermarkets. The modular construction shown exemplarily in FIG. 4 not only allows larger quantities of different baked goods to be offered, but the total throughput quantity is also naturally larger compared to the design shown in accordance with the FIGS. 1-3.

The automatic baking machine according to FIG. 4 has only one collection device 11. So that pretzels transported to the oven unit 20 cannot be removed either from this stationary linear conveyor 15 (in FIG. 4 top), it is kept operating in forward motion so the pretzels (in this case, two) can be transferred to the other stationary linear conveyor 15 (in FIG. 4, bottom), which will then transport these pretzels to the collection device 11 for disposal. The waiting staff must therefore empty merely one single collection container 13. In addition, the material for another collection device 11—which would require more space—is saved.

All the operations taking place in the automatic baking machine according to the invention are preferably controlled by a centralized electrical control system (not shown) that controls especially the transportation of the baked goods, determines the demand for goods to be baked and indicates this on the input panel with the display 10.

This invention is not restricted to the embodiments shown. Variations within the claims are certainly possible.

The invention claimed is:

1. An automatic baking machine, comprising:
  a loading unit having a plurality of carriers attached to a first vertical conveyor configured for receipt at a load position of individual goods to be baked, the first vertical conveyor movable in a vertical conveying path to sequentially bring the carriers to the load position, the first vertical conveyor having an uppermost unload position where the goods are removed from the carriers;
  an oven unit arranged downstream from said loading unit, said oven unit having an input end and a linearly opposite delivery end, and a transportation conveyor moving in an endless loop in the oven unfit and configured to transport the individual goods placed on the transportation conveyor linearly through said oven unit in a single linear conveying direction from said input end to said opposite delivery end;
  a delivery unit arranged downstream from said oven unit adjacent to said delivery end, said delivery unit having a second vertical conveyor with a plurality of carriers attached thereto for receipt of baked goods directly from said transportation conveyor;
  a linear conveyor arranged between the uppermost unload position of said first conveyor and said transportation conveyor, wherein the individual goods to be baked are transferred from the uppermost unload position of said first conveyor to said linear conveyor, conveyed by said linear conveyor in a conveying direction perpendicular to the linear conveying direction of the transportation conveyor, and transferred from said linear conveyor to said transportation conveyor, wherein said linear conveyor and said transportation conveyor are fixed vertically in position such that the goods to be baked are conveyed along a common fixed horizontal plane along the linear conveyor, transferred from the linear conveyor to the transportation conveyor, and conveyed linearly through the oven unit on the transportation conveyor in the single linear direction from the input end to the opposite delivery end, and then onto the carriers of the second vertical conveyor of the delivery unit; and a collection device arranged at an end of the linear conveyor; and the linear conveyor configured to automatically reverse direction after transfer of the goods to be baked to the transportation conveyor so as to convey any goods that were not transferred and remain on the linear conveyor to the collection device.

2. The baking machine as in claim 1, wherein said plurality of carriers are arranged longitudinally on said first conveyor, said linear conveyor disposed to move in a direction parallel to the longitudinal orientation of said plurality of carriers on said first conveyor.

3. The baking machine as in claim 1, further comprising an additional said loading unit and respective said first conveyor, said linear conveyor arranged to receive the goods to be baked from each of said loading units and deliver the goods to said oven unit.

4. The baking machine as in claim 3, wherein the linear conveyor moves the goods to be baked from said loading unit in a first direction and moves the goods to be baked from said additional loading unit in an opposite second direction such that the respective goods to be baked from said loading units move towards each other.

5. The baking machine as in claim 4, wherein said linear conveyor comprises two separate conveyors arranged end-to-end and running in opposite directions such that goods to be baked are transferable from one of said separate conveyors to said other separate conveyor.

6. The baking machine as in claim 1, wherein said linear conveyor is arranged at a loading side of said first conveyor where the goods to be baked are loaded onto said carriers on said first conveyor.

7. The baking machine as in claim 1, wherein said collection device comprises a chute.

8. The baking machine as in claim 1, further comprising sliders arranged to transfer the goods to be baked from said first conveyor to said linear conveyor, and from said linear conveyor to said transportation device.

9. The baking machine as in claim 8, wherein the goods to be baked maintain the same relative position on said first conveyor, said linear conveyor, said transportation device, and said second conveyor.

10. The baking machine as in claim 1, wherein said oven unit is accessible from below and arranged so that staff personnel can walk below said oven unit.

11. The baking machine as in claim 1, further comprising a slider configured to move the goods to be baked from the linear conveyor to the transportation conveyor, wherein the linear conveyor automatically reverses direction upon each actuation of the slider.

12. The baking machine as in claim 1, further comprising a slider configured to move the goods to be baked from the linear conveyor to the transportation conveyor, and a sensor positioned relative to the linear conveyor and slider, wherein the linear conveyor automatically reverses direction upon the sensor sensing remaining goods on the linear conveyor after actuation of the slider.

* * * * *